Sept. 25, 1928.
J. S. ANDERSON
VEHICLE LIGHT
Filed March 19, 1928
1,685,622
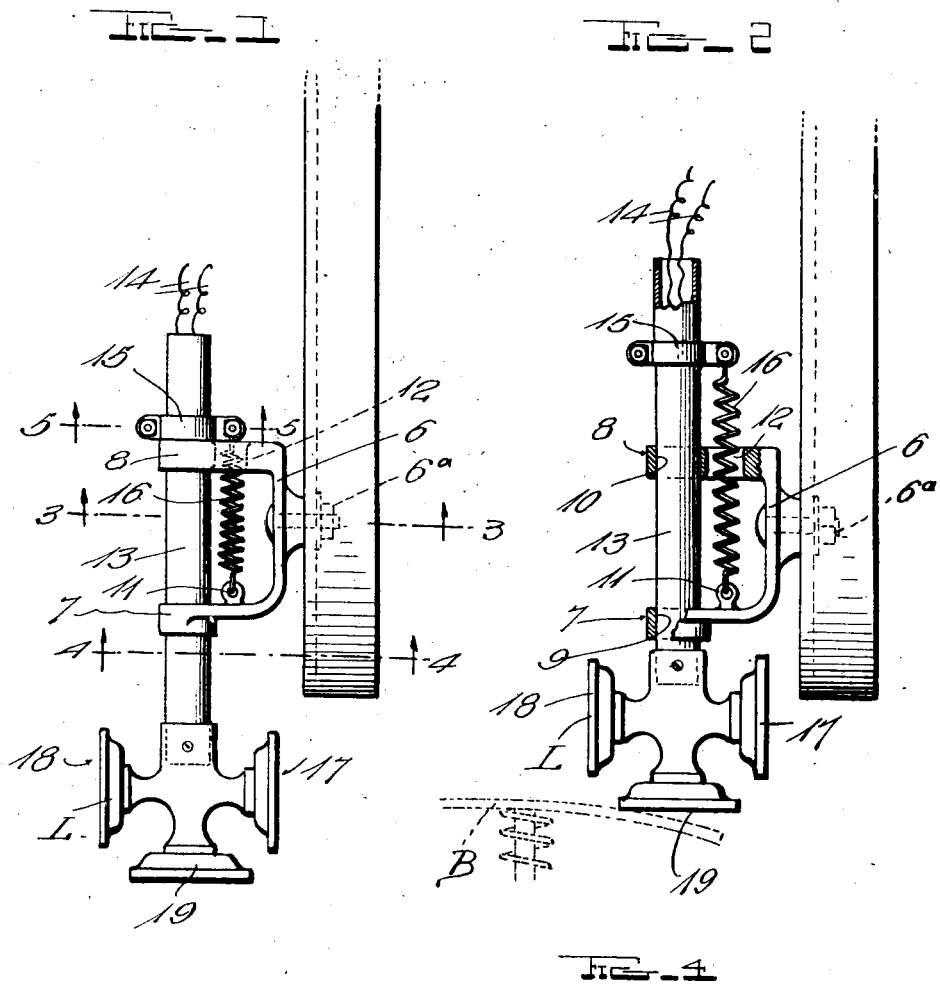
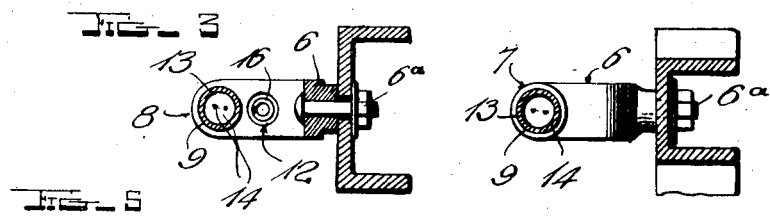
Inventor
James S. Anderson,
Witness
Attorneys Patented Sept. 25, 1928.

1,685,622

UNITED STATES PATENT OFFICE.

JAMES S. ANDERSON, OF AMES, NEBRASKA.

VEHICLE LIGHT.

Application filed March 19, 1928. Serial No. 262,832.

The invention relates to running or signal lights for automobiles and in its present embodiment, constitutes a rear light visible at right, left and back, and if desired, it may embody illuminating means for indicating right and left turns, and stops. The invention however, is concerned primarily with mounting means for the light rather than with the functions attained by the latter.

It is the principal object of the invention to provide a rather simple and inexpensive, yet an efficient and desirable means for yieldably mounting the light so that it will yield instead of being damaged, if struck, for instance by the bumper of another machine.

With the foregoing in view, the invention resides in the novel subject matter hereinafter described and claimed, description being accomplished by reference to the accompanying drawing.

Fig. 1 is a top plan view showing the light mounted on one of the chassis frame bars of an automobile.

Fig. 2 is a top plan view partly in horizontal section showing the manner in which the light may yield when struck.

Figs. 3, 4, and 5 are detail sectional views on the correspondingly numbered lines of Fig. 1.

While the construction herein disclosed will be specifically described, it is to be understood that within the scope of the invention as claimed, variations may be made.

The numeral 6 denotes a supporting bracket provided with means such as a bolt 6ª, for securing it to a chassis frame bar or other desired part of an automobile. This bracket embodies horizontally spaced, laterally projecting arms 7—8 formed with horizontally alined bearing openings 9—10, respectively. Arm 7 is provided with a spring anchor 11 and in alinement with this anchor, arm 8 is formed with an opening 12 in addition to its bearing opening 10.

A tubular, horizontally elongated light carrier 13 is slidably received in the bearing openings 9—10 and contains a wire or wires 14 for conducting current to the light proper L which is suitably mounted on one end of said carrier. The passage of current through the wire or wires may be controlled by any desired switch means.

Clamped around the carrier 13 at the outer side of the arm 8, is a collar 15 to which one end of a coiled tension spring 16 is connected. This spring passes through the opening 12 and is anchored to the anchor 11, and it serves to hold the parts in the normal position shown in Fig. 1, in which position the collar 15 abuts the arm 8 and limits the movement of the carrier 13 in one direction, the light L being at that time outwardly spaced from the arm 7. If this light be struck, for instance, by the bumper B of another automobile, said lamp and the carrier 13 may slide against the tension of the spring 16, as shown in Fig. 2. Hence, there is less liability of injuring the light than if it were rigidly mounted.

In the present showing, light L embodies portions 17—18 visible from the right and left, and a portion 19 visible from the rear. Were the carrier 13 permitted to turn within the bearing openings 9—10, the portions 17—18 would not occupy their proper positions. By passing the spring 16 through the opening 12 however, the carrier 13 is held against such turning, insuring that the light portions 17—18 shall remain in proper relation with the vehicle.

Excellent results are obtainable from the details disclosed, and they may be followed if desired. However, within the scope of the invention as claimed, variations may be made.

I claim:—

1. In a vehicle light, a bracket and means for attaching it to a vehicle, said bracket having laterally projecting horizontally spaced arms provided with horizontally alined bearing openings, one of said arms being provided with a spring anchor and the other being formed with an opening in addition to its bearing opening, a horizontally elongated light carrier slidable in said bearing openings, a coiled tension spring passing through said additional opening and anchored at one end to said spring anchor, and a projection on said carrier to which the other end of said spring is connected, said spring serving to yieldably hold said carrier in a position at which said projection abuts said other arm.

2. In a vehicle light, a bracket and means for attaching it to a vehicle, said bracket having laterally projecting horizontally spaced arms provided with horizontally alined bearing openings, a horizontally elongated light carrier slidable in said bearing openings, a coiled tension spring extending longitudinally of said carrier, said spring being connected at one end to one of said bracket arms and at its other end to said carrier, and a stop on said carrier to abut one of said arms, said spring serving to yieldably hold said stop against the arm and permitting yielding of the light carrier in case it is struck by an extraneous object.

In testimony whereof I have hereunto affixed my signature.

JAMES S. ANDERSON.